UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

PROCESS OF MAKING ORTHO-OXYMONOAZO DYE.

987,999.  Specification of Letters Patent.  Patented Mar. 28, 1911.

No Drawing.  Application filed December 13, 1910.  Serial No. 597,060.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hessen, Germany, with the postoffice address Gerberstrasse No. 5, have invented new and useful Improvements in Processes of Making Ortho-Oxymonoazo Dye, of which the following is a specification.

I have discovered that a mordant azo dyestuff of remarkable fastness can be obtained by combining the diazotized nitroaminosalicylic acid $$(OH:COOH:NO_2:NH_2=1:2:4:6)$$

with para-cresol. The thus obtained dyestuff dyes wool from acid bath by subsequent treatment with chromates yellowish-brown shades of eminent fastness to light. The dyeing process and the treatment with chromates can be carried out in one bath at the same time.

The manufacture of the new dyestuff may be illustrated by the following example: parts being by weight:

Example: 50 parts of nitroaminosalicylic acid $$(OH:COOH:NO_2:NH_2=1:2:4:6)$$

are dissolved in 400 parts of water by means of 35 parts caustic soda lye 35° Bé., 17.5 parts of sodium nitrite are added, the mixture cooled with ice and poured into 114 parts of hydrochloric acid 20° Bé. cooled with ice. The thus obtained diazo compound is poured into a well cooled solution of 32 parts of para-cresol in the necessary quantity of caustic soda lye containing an excess of sodium carbonate. The mixture is stirred until the formation of dyestuff is completed, heated up to 70° and the dyestuff precipitated by addition of common salt. It is in dry state a brown-black powder, dissolving in concentrated sulfuric acid with reddish brown, in water with yellowish brown color. This solution turns more reddish by addition of caustic soda lye: by addition of concentrated hydrochloric acid the dyestuff is precipitated as reddish flakes. The dyestuff dyes wool from acid bath brownish-yellow shades, which, by subsequent treatment with chromates are turned into yellowish brown ones of very good fastness to milling and potting and eminent fastness to light.

Now what I claim and desire to secure by Letters Patent is the following:

1. The process of manufacturing a ortho-oxy-monoazo dyestuff, consisting in combining the diazotized nitroaminosalicylic acid $$(OH:COOH:NO_2:NH_2=1:2:4:6)$$

with para-cresol.

2. As a new product, the ortho-oxy-monoazo dyestuff which is obtained by combining the diazotized nitroaminosalicylic acid $$(OH:COOH:NO_2:NH_2=1:2:4:6)$$

with para-cresol, which dyestuff is a brown-black powder dissolving in concentrated sulfuric acid with reddish brown, in water with yellowish brown color, which by addition of caustic soda lye turns more reddish, whereas by addition of concentrated hydrochloric acid the dyestuff is precipitated in form of reddish flakes, which dyestuff dyes wool from acid bath brownish-yellow shades which, by subsequent treatment with chromates are turned in yellowish-brown ones of very good fastness to milling and potting and eminent fastness to light.

In testimony, that I claim the foregoing as my invention, I have signed my name in presence of two witnesses, this second day of December 1910.

AUGUST LEOPOLD LASKA.

Witnesses:
  HERMANN WEIL,
  EMMA MARX.